United States Patent
Goyal (10) Patent No.: US 11,042,844 B2
(45) Date of Patent: Jun. 22, 2021

(54) AUTOMATED MEETING SCHEDULING BASED ON EMAIL CONTENT

(71) Applicant: TimeTrade Systems, Inc., Tewksbury, MA (US)

(72) Inventor: Mukul Goyal, Tewksbury, MA (US)

(73) Assignee: TIMETRADE SYSTEMS, INC., Tewksbury, MA (US)

( * ) Notice: Subject to any disclaimer, the term of this patent is extended or adjusted under 35 U.S.C. 154(b) by 223 days.

(21) Appl. No.: 15/892,748

(22) Filed: Feb. 9, 2018

(65) Prior Publication Data

US 2018/0260789 A1 Sep. 13, 2018

Related U.S. Application Data

(60) Provisional application No. 62/469,049, filed on Mar. 9, 2017.

(51) Int. Cl.
| | |
|---|---|
| *G06Q 10/10* | (2012.01) |
| *G06F 9/54* | (2006.01) |
| *H04L 12/58* | (2006.01) |
| *H04L 29/12* | (2006.01) |

(52) U.S. Cl.
CPC ......... *G06Q 10/1095* (2013.01); *G06F 9/547* (2013.01); *G06Q 10/107* (2013.01); *H04L 51/02* (2013.01); *H04L 51/18* (2013.01); *H04L 51/22* (2013.01); *H04L 51/28* (2013.01); *H04L 61/307* (2013.01)

(58) Field of Classification Search
None
See application file for complete search history.

(56) References Cited

U.S. PATENT DOCUMENTS

| | | | |
|---|---|---|---|
| 7,693,736 B1 | 4/2010 | Chu et al. | |
| 8,433,753 B2 | 4/2013 | Qi | |
| 2003/0074186 A1* | 4/2003 | Wang | G06F 40/30 704/4 |
| 2004/0215497 A1 | 10/2004 | Leist | |
| 2007/0288575 A1* | 12/2007 | Gillum | G06Q 10/107 709/206 |
| 2009/0281860 A1 | 11/2009 | Bhogal et al. | |
| 2010/0146058 A1* | 6/2010 | Naef | G06Q 10/109 709/206 |
| 2014/0278673 A1 | 9/2014 | Wetzold et al. | |
| 2015/0281295 A1* | 10/2015 | Tong | H04L 12/1822 715/753 |
| 2016/0019485 A1* | 1/2016 | Hosabettu | G06Q 10/1095 705/7.19 |

* cited by examiner

*Primary Examiner* — Akosua Kyereme-Tuah
(74) *Attorney, Agent, or Firm* — Edell, Shapiro & Finnan, LLC (57) ABSTRACT

In one example embodiment, a server receives an email message from a user device, and extracts email addresses from the email message. The server determines whether the email addresses are associated with multiple organizations. If it is determined that the email addresses are associated with the multiple organizations, the server sends a response to the email message including a scheduling link that, when selected, provides scheduling information for one or more prospective meeting attendees associated with one or more of the email addresses. If it is determined that the email addresses are not associated with the multiple organizations, the server automatically prompts a meeting to be scheduled on respective calendars associated with the email addresses.

20 Claims, 6 Drawing Sheets

AUTOMATED MEETING SCHEDULING BASED ON EMAIL CONTENT

CROSS REFERENCE TO RELATED APPLICATION

This application claims priority to U.S. Provisional Application No. 62/469,049, filed Mar. 9, 2017, the entirety of which is incorporated herein by reference.

TECHNICAL FIELD

The present disclosure relates to web-based calendar/appointment systems.

BACKGROUND

Meeting/appointment scheduling allows a service provider to interact with its clients/customers. Online/web-based appointment scheduling has become a prevalent tool used to allow customers to book appointments with service providers, and allows services providers a chance to make a positive impression on clients/customers. However, professionals throughout various industries often spend excess time and resources manually organizing meetings with colleagues and/or customers via email. This is inefficient and negatively impacts productivity.

DESCRIPTION OF EXAMPLE EMBODIMENTS

Overview

In one example embodiment, a server receives an email message from a user device, and extracts email addresses from the email message. The server determines whether the email addresses are associated with multiple organizations. If it is determined that the email addresses are associated with the multiple organizations, the server sends a response to the email message including a scheduling link that, when selected, provides scheduling information for one or more prospective meeting attendees associated with one or more of the email addresses. If it is determined that the email addresses are not associated with the multiple organizations, the server automatically prompts a meeting to be scheduled on respective calendars associated with the email addresses.

Detailed Description

In certain situations, face-to-face/real-time interactions may be more desirable than email communication. For example, complex subject matter often cannot easily be addressed in an email message and requires an in-person or virtual meeting to resolve the issue. Such meetings are often scheduled in response to ongoing email discussions. Accordingly, described is an email scheduling bot/service for automated meeting scheduling based on email.

Figure 1:
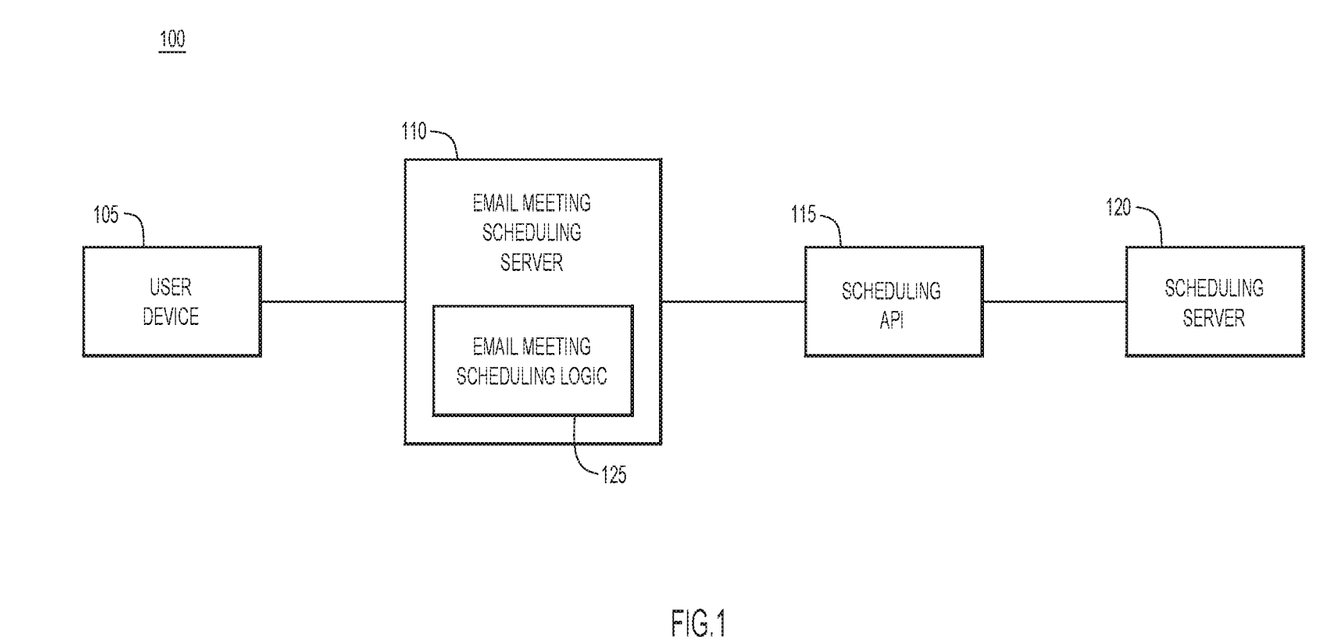
FIG. 1 is a block diagram of a system configured to automatically schedule meetings by email, in accordance with an example embodiment.

FIG. 1 is a block diagram of an example system 100 configured to automatically schedule meetings by email. System 100 includes a user device 105, email meeting scheduling server 110, scheduling Application Programming Interface (API) 115, and scheduling server 120. The email meeting scheduling server 110 includes email meeting scheduling logic 125.

A user of user device 105 may belong to an organization, and may wish to schedule a meeting with one or more prospective meeting attendees. In certain examples, the user may also be a prospective meeting attendee.

Two specific example embodiments are described herein. In the first example embodiment, the prospective meeting attendees are part of the same organization. In the second example embodiment, the prospective meeting attendees are part of different organizations.

Figure 2:
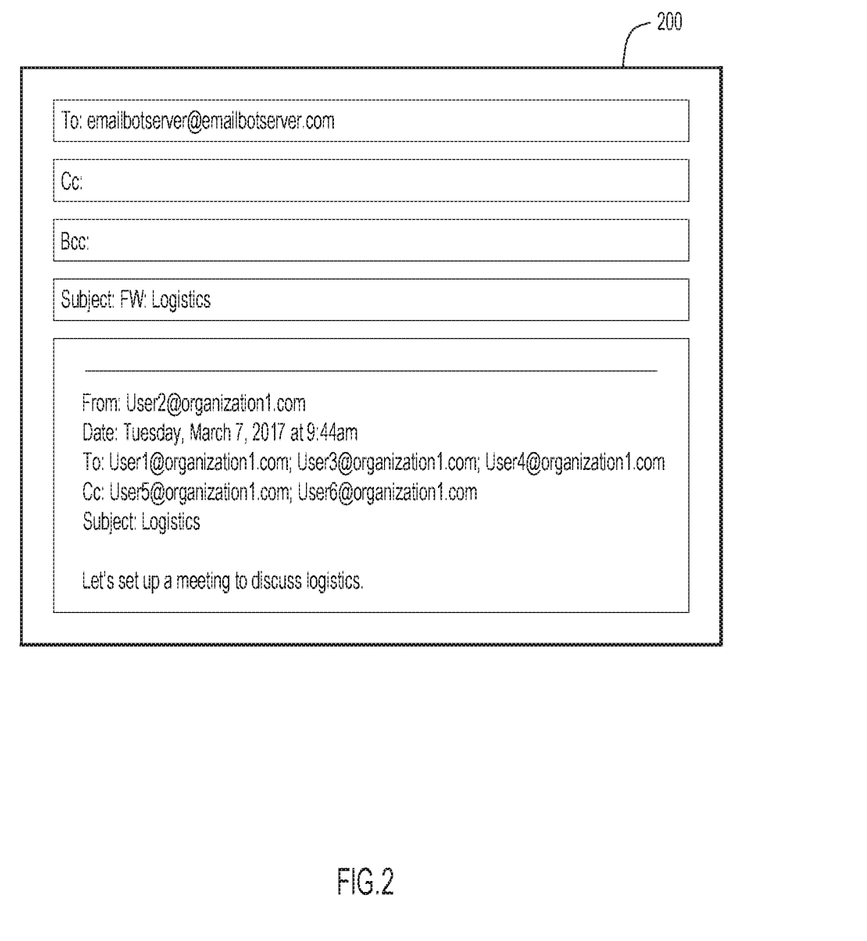
FIG. 2 illustrates an email message that a user may send to an email meeting scheduling server, in accordance with an example embodiment.

The first example embodiment is described in relation to FIG. 2, with continued reference to FIG. 1. In this example embodiment, the user may wish to schedule an internal meeting (i.e., a meeting including only members of the same organization). For instance, the user may wish to schedule a meeting in response to an email message received from one or more prospective meeting attendees who are all employees/members of, or otherwise affiliated with, the organization.

In order to schedule the meeting, the user may forward, via user device 105, the email message to an email address of an automated meeting scheduling service. The automated meeting scheduling service may be hosted on email meeting scheduling server 110.

For instance, the user may send email message 200 (FIG. 2) to email meeting scheduling server 110. In this example, the user of user device 105 ("User1@organization1.com") received a message from a prospective meeting attendee ("User2@organization1.com") requesting to set up a meeting. The request was also addressed to other members of the organization (i.e., "User3@organization1.com," "User4@organization1.com," "User5@organization1.com," and "User6@organization1.com"). The email address of the automated meeting scheduling service is "emailbotserver@emailbotserver.com."

Upon receiving email message 200, the email meeting scheduling server 110 extracts the email addresses (i.e., "User1@organization1.com," "User2@organization1.com," "User3@organization1.com," "User4@organization1.com," "User5@organization1.com," and "User6@organization1.com") from the email message 200, and determines whether the email addresses are associated with multiple organizations. In this first example embodiment, the email meeting scheduling server 110 determines that the email addresses are not associated with multiple organizations. For instance, the email meeting scheduling server 110 may parse the text of the email message to determine that each of the listed email addresses share the same domain (i.e., "organization1.com").

In response to determining that the email addresses are not associated with multiple organizations, the email meeting scheduling server 110 may automatically prompt a meeting to be scheduled on respective calendars associated with the email addresses. Specifically, the respective calendars may be respective work calendars (e.g., electronic calendars provided by organization1) for the prospective meeting attendees.

The email meeting scheduling server 110 may call scheduling API 115 in communication with scheduling server 120 to automatically schedule the meeting. The scheduling server 120 may be in communication with/have access to the respective calendars, and may automatically add the meeting to each of the respective calendars based on the availability (and/or other factors) of the prospective meeting attendees.

Figure 3A:
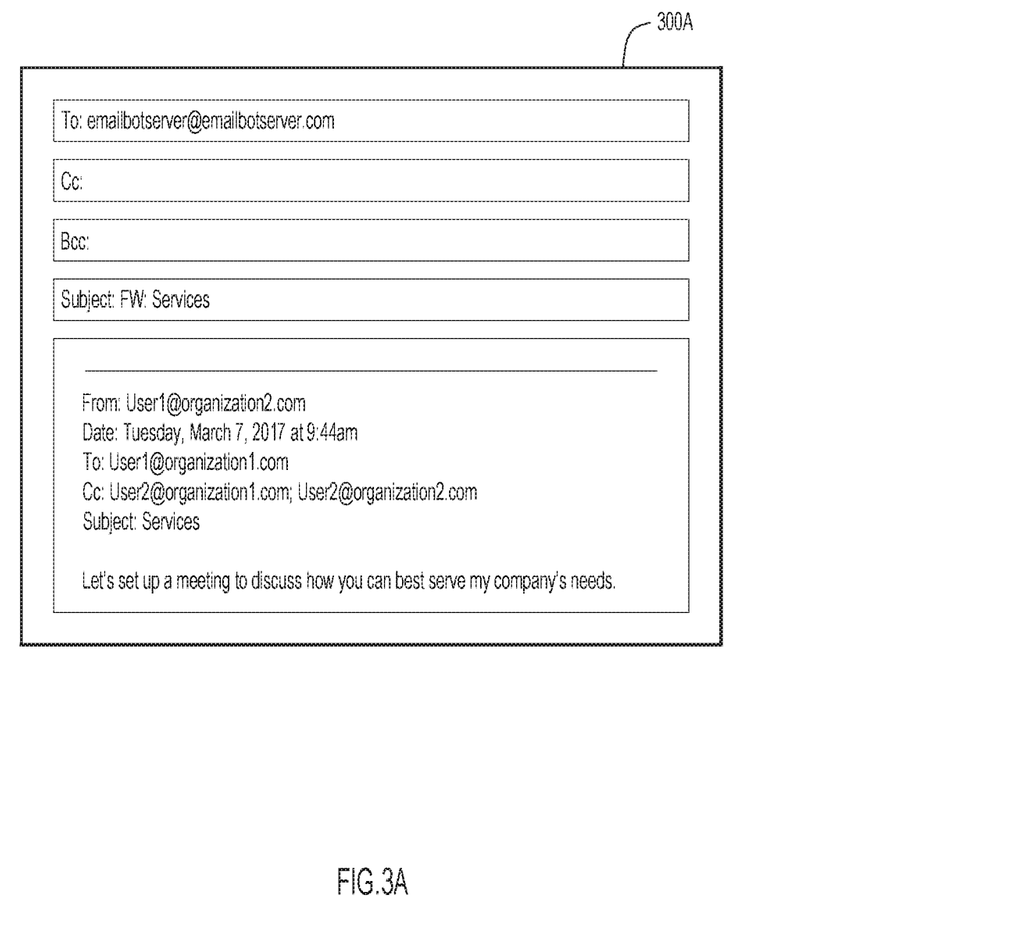
FIG. 3A illustrates another email message that a user may send to an email meeting scheduling server, in accordance with an example embodiment.
Figure 3B:
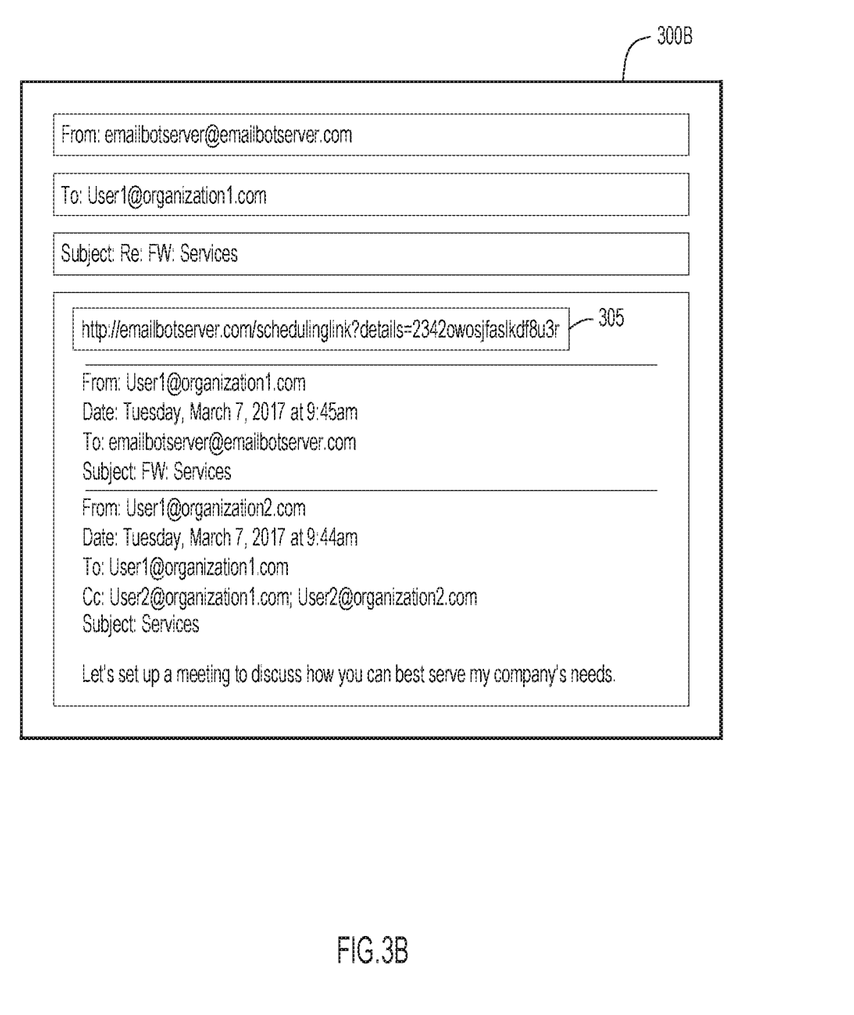
FIG. 3B illustrates a response to the email message of FIG. 3A that a user may receive from the email meeting scheduling server, in accordance with an example embodiment.

The second example embodiment is described in relation to FIGS. 3A and 3B, with continued reference to FIG. 1. In this example embodiment, the user may wish to schedule a meeting with members of multiple organizations. For instance, the user may wish to schedule a meeting in response to an email message received from one or more prospective meeting attendees who are employees/members of, or otherwise affiliated with, another organization.

As shown in FIG. 3A, the user may send email message 300A to email meeting scheduling server 110. In this example, the user of user device 105 ("User1@organization1.com") received a message from a prospective meeting attendee ("User1@organization2.com") requesting to set up a meeting. The request was also addressed to "User2@organization1.com," and "User2@organization2.com." Thus, the meeting in this example is to include a total of four members representing two different organizations.

Upon receiving email message 300A, the email meeting scheduling server 110 extracts the email addresses (i.e., "User1@organization1.com," "User2@organization1.com," "User1@organization2.com," and "User2@organization2.com,") from the email message 300A, and determines whether the email addresses are associated with multiple organizations. In this second example embodiment, the email meeting scheduling server 110 determines that the email addresses are associated with multiple organizations. For instance, the email meeting scheduling server 110 may parse the text of the email message to determine that the listed email addresses have different domains (i.e., "organization1.com" and "organization2.com").

The email meeting scheduling server 110 may further determine that these different domains are not associated with each other. For example, the email meeting scheduling server 110 may further determine that "organization1.com" and "organization2.com" do not belong to a single organization. The email meeting scheduling server 110 may additionally automatically add "User1@organization2.com," and "User2@organization2.com," to a client (and/or prospective client) database.

In response to determining that the email addresses are associated with multiple organizations, the email meeting scheduling server 110 may send a response to the email message including a scheduling link that, when selected, provides scheduling information (e.g., availability data) for one or more prospective meeting attendees associated with one or more of the email addresses.

FIG. 3B illustrates an example response 300B. The response 300B may include scheduling link 305 and, optionally, a video conferencing link (not shown).

The scheduling server 120 may be in communication with/have access to respective calendars of the prospective meeting attendees associated with organization1 (i.e., "User1@organization1.com" and "User2@organization1.com"). The email meeting scheduling server 110 may determine that this group of email addresses is associated with organization1, and call scheduling API 115 in communication with scheduling server 120 to generate the scheduling link 305. Specifically, the scheduling server 120 may determine the scheduling information of the prospective meeting attendees associated with organization1, and use this scheduling information to generate scheduling link 305.

The email meeting scheduling server 110 may receive scheduling link 305 from the scheduling server 120 via the scheduling API 115. When selected, the scheduling link 305 provides scheduling information for prospective meeting attendees associated with the group of email addresses (i.e., "User1@organization1.com" and "User2@organization1.com").

As shown in FIG. 300B, email meeting scheduling server 110 sends the response 300B back to "User1@organization1.com" to enable the user to forward the response 300B to the prospective meeting attendees associated with organization2 (i.e., "User1@organization2.com" and "User2@organization2.com"). In another example, the email meeting scheduling server 110 may automatically send the response directly to the prospective meeting attendees associated with organization2.

Upon receiving the scheduling link 305, the prospective meeting attendees associated with organization2 may select the scheduling link 305 to obtain the scheduling information of the prospective meeting attendees associated with organization1. The prospective meeting attendees associated with organization2 may coordinate with each other to select an available time slot during which all four prospective meeting attendees are available. The scheduling server 120 may automatically update the calendars of one or more of the prospective meeting attendees accordingly.

In either example embodiment (single organization or multiple organizations), the user may add information to the body of the email message before sending the email message to the email meeting scheduling server 110. For example, the user may insert conditions for the scheduling information or the meeting. These conditions may include a meeting type (e.g., standalone/recurring), a meeting location, a meeting time, and/or conferencing software to be used during the meeting. In other words, a set of tokens (e.g., "in the next two weeks") may be inserted into the email message to provide scheduling hints to the email meeting scheduling server 110. The email meeting scheduling server 110 may make intelligent decisions when to schedule the meeting based on these tokens.

In another example, the user may insert one or more email addresses into the body of the email message. When the email meeting scheduling server 110 receives the email message, the email meeting scheduling server 110 may extract the inserted email addresses and identify them as being associated with prospective meeting attendees. This ensures that the email meeting scheduling server 110 takes into account the availability of the prospective meeting attendees associated with these inserted email addresses before an appointment is automatically scheduled or an appointment link is generated.

The email meeting scheduling server 110 may use Artificial Intelligence (AI), Natural Language Processing (NLP), and/or Machine Learning (ML) techniques to determine which prospective meeting attendees to invite to the meeting. For example, the email meeting scheduling server 110 may automatically include a manager or other higher-level person in an organization hierarchy if the "tone" of the email appears dire or serious, or may automatically add a technical sales representative if the content of the email is technical in nature.

Figure 4:
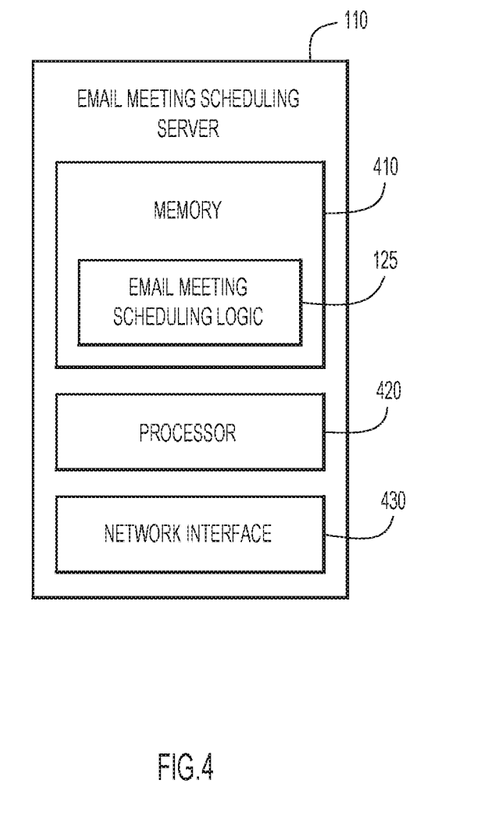
FIG. 4 is a block diagram of an email meeting scheduling server, in accordance with an example embodiment.

FIG. 4 is a simplified block diagram of email meeting scheduling server 110. In this example, the email meeting scheduling server 110 includes a memory 410 that stores instructions for the email meeting scheduling logic 125, one or more processors 420, and a network interface 430. The one or more processors 420 are configured to execute instructions stored in the memory 410 for the email meeting scheduling logic 125. When executed by the one or more processors 420, the email meeting scheduling logic 125 causes the email meeting scheduling server 110 to perform operations described herein.

The memory 410 may be read only memory (ROM), random access memory (RAM), magnetic disk storage media devices, optical storage media devices, flash memory devices, electrical, optical, or other physical/tangible memory storage devices. Thus, in general, the memory 410 may be one or more tangible (non-transitory) computer readable storage media (e.g., a memory device) encoded with software comprising computer executable instructions and when the software is executed (by the processor 420) it is operable to perform operations described herein.

The network interface 430 is a network interface card (or multiple instances of such a device) or other network interface device that enables network communications on behalf of the email meeting scheduling server 110 for sending and receiving messages (e.g., email messages) as described above.

Figure 5:
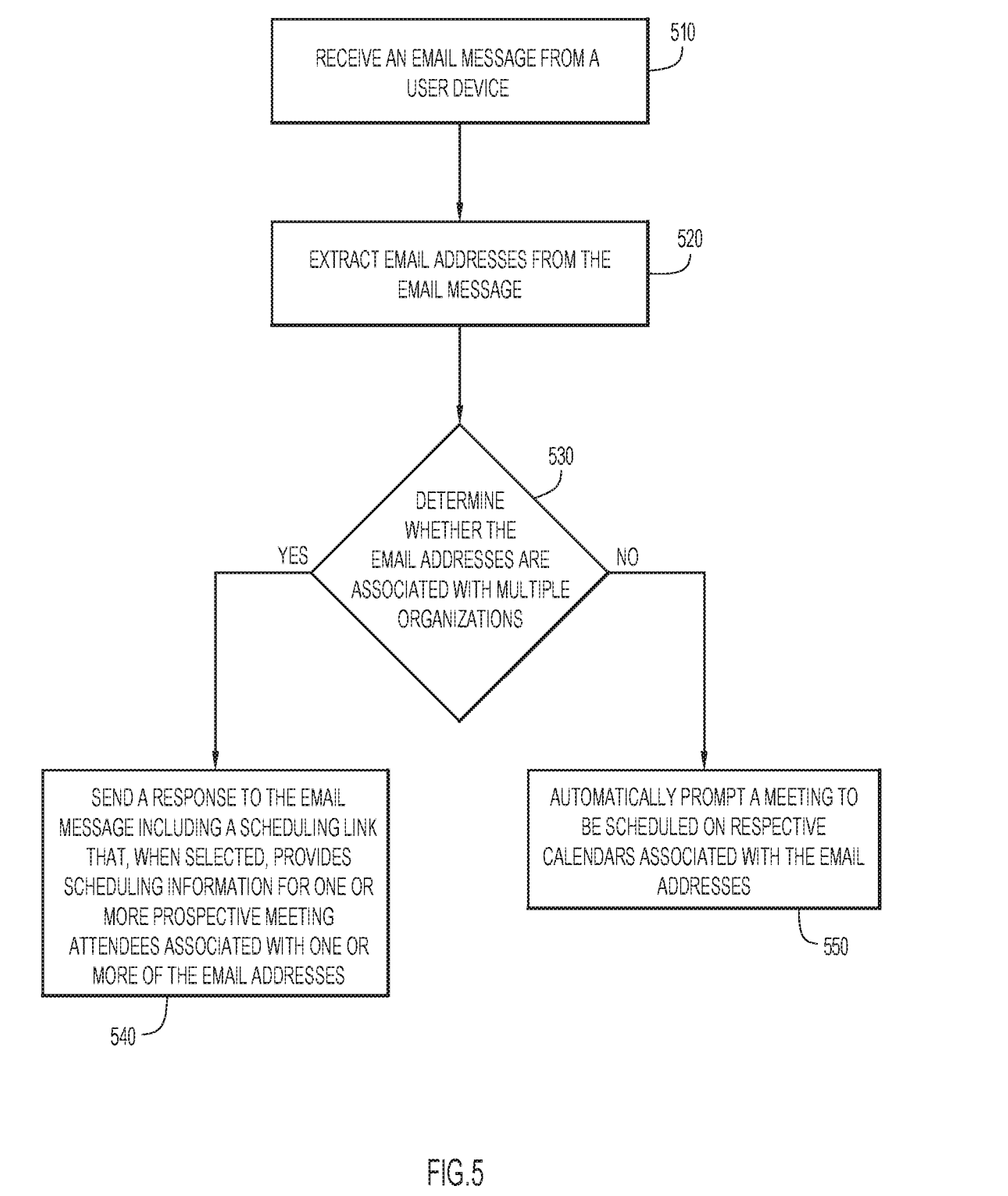
FIG. 5 is a flowchart of a method for automatically scheduling meetings by email, in accordance with an example embodiment.

FIG. 5 is a flowchart of an example method for automatically scheduling meetings by email. The method may be performed by a server (e.g., email meeting scheduling server 110). At 510, the server receives an email message from a user device. At 520, the server extracts email addresses from the email message. At 530, the server determines whether the email addresses are associated with multiple organizations.

At 540, if it is determined that the email addresses are associated with the multiple organizations ("yes"), the server sends a response to the email message including a scheduling link that, when selected, provides scheduling information for one or more prospective meeting attendees associated with one or more of the email addresses. At 550, if it is determined that the email addresses are not associated with the multiple organizations ("no"), the server automatically prompts a meeting to be scheduled on respective calendars associated with the email addresses.

It will be understood that the email meeting scheduling server 110 may perform operations described herein for any number of email addresses belonging to any number of groups/organizations. In addition, any number of servers (e.g., one server, three servers, four servers, etc.) may perform the operations described as being performed by the email meeting scheduling server 110 and the scheduling server 120.

In one form, a computer-implemented method is provided. The computer-implemented method is performed by an email meeting scheduling server and comprises: receiving an email message from a user device; extracting email addresses from the email message; determining whether the email addresses are associated with multiple organizations; if it is determined that the email addresses are associated with the multiple organizations, sending a response to the email message including a scheduling link that, when selected, provides scheduling information for one or more prospective meeting attendees associated with one or more of the email addresses; and if it is determined that the email addresses are not associated with the multiple organizations, automatically prompting a meeting to be scheduled on respective calendars associated with the email addresses.

In one embodiment, if it is determined that the email addresses are associated with the multiple organizations, the method further comprises calling a scheduling application programming interface in communication with a scheduling server to generate the scheduling link; and receiving the scheduling link from the scheduling server via the scheduling application programming interface.

In another embodiment, if it is determined that the email addresses are associated with the multiple organizations, the method further comprises determining that a first group of the email addresses is associated with a first organization, wherein the scheduling link, when selected, provides scheduling information for prospective meeting attendees associated with the first group of the email addresses.

Automatically prompting the meeting to be scheduled may include calling a scheduling application programming interface in communication with a scheduling server to automatically schedule the meeting. Moreover, extracting the email addresses from the email may include extracting email addresses inserted into a body of the email message.

The email message may specify one or more conditions for the scheduling information or the meeting. The one or more conditions may include a meeting type, a meeting location, a meeting time, and/or conferencing software.

In another form, an apparatus is provided. The apparatus comprises: a memory; a network interface configured to send and/or receive email messages; and a processor coupled to the memory and the network interface, wherein the processor is configured to: receive an email message from a user device; extract email addresses from the email message; determine whether the email addresses are associated with multiple organizations; if it is determined that the email addresses are associated with the multiple organizations, send a response to the email message including a scheduling link that, when selected, provides scheduling information for one or more prospective meeting attendees associated with one or more of the email addresses; and if it is determined that the email addresses are not associated with the multiple organizations, automatically prompt a meeting to be scheduled on respective calendars associated with the email addresses.

In another form, one or more non-transitory computer readable storage media are provided. The non-transitory computer readable storage media are encoded with instructions that, when executed by a processor, cause the processor to: receive an email message from a user device; extract email addresses from the email message; determine whether the email addresses are associated with multiple organizations; if it is determined that the email addresses are associated with the multiple organizations, send a response to the email message including a scheduling link that, when selected, provides scheduling information for one or more prospective meeting attendees associated with one or more of the email addresses; and if it is determined that the email addresses are not associated with the multiple organizations, automatically prompt a meeting to be scheduled on respective calendars associated with the email addresses.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method performed by an email meeting scheduling server comprising:
receiving an email message from a user device;
parsing digital data representing a body of the email message, wherein the body of the email message includes a plurality of email addresses associated with prospective meeting attendees, one or more messages previously sent between the prospective meeting attendees, and a set of tokens including one or more words inserted at the user device before the email message is received from the user device, wherein the set of tokens specifies one or more conditions for scheduling information or a meeting with the prospective meeting attendees;
based on the parsing, determining that a prospective meeting attendee who is not associated with the email addresses should be included in the meeting based on a tone of the email message and a position of the prospective meeting attendee who is not associated with the email addresses;
based further on the parsing, extracting the email addresses from the email message;
determining whether the email addresses are associated with multiple organizations;
if it is determined that the email addresses are associated with the multiple organizations, automatically sending a response to the email message including a scheduling link that, when selected, provides the scheduling information for a first group of the prospective meeting attendees who are associated with a first group of the email addresses associated with a first organization and the prospective meeting attendee who is not associated with the email addresses; and
if it is determined that the email addresses are not associated with the multiple organizations, automatically prompting the meeting to be scheduled on respective calendars associated with the prospective meeting attendees and on a calendar associated with the prospective meeting attendee who is not associated with the email addresses.

2. The method of claim 1, further comprising:
if it is determined that the email addresses are associated with the multiple organizations:
calling a scheduling application programming interface in communication with a scheduling server to generate the scheduling link; and
receiving the scheduling link from the scheduling server via the scheduling application programming interface.

3. The method of claim 1, further comprising:
if it is determined that the email addresses are associated with the multiple organizations:
determining that the first group of the email addresses are associated with the first organization.

4. The method of claim 1, wherein automatically prompting the meeting to be scheduled includes calling a scheduling application programming interface in communication with a scheduling server to automatically schedule the meeting.

5. The method of claim 1, wherein the one or more conditions include a meeting type.

6. The method of claim 1, wherein the one or more conditions include a meeting location.

7. The method of claim 1, wherein the one or more conditions include a meeting time.

8. The method of claim 1, wherein the one or more conditions include conferencing software.

9. An apparatus comprising:
a memory;
a network interface configured to send and/or receive email messages; and
a processor coupled to the memory and the network interface, wherein the processor is configured to:
receive an email message of the email messages from a user device;
parse digital data representing a body of the email message, wherein the body of the email message includes a plurality of email addresses associated with prospective meeting attendees, one or more messages previously sent between the prospective meeting attendees, and a set of tokens including one or more words inserted at the user device before the email message is received from the user device, wherein the set of tokens specifies one or more conditions for scheduling information or a meeting with the prospective meeting attendees;
based on the parsing, determine that a prospective meeting attendee who is not associated with the email addresses should be included in the meeting based on a tone of the email message and a position of the prospective meeting attendee who is not associated with the email addresses;
based further on the parsing, extract the email addresses from the email message;
determine whether the email addresses are associated with multiple organizations;
if it is determined that the email addresses are associated with the multiple organizations, automatically send a response to the email message including a scheduling link that, when selected, provides the scheduling information for a first group of the prospective meeting attendees who are associated with a first group of the email addresses associated with a first organization and the prospective meeting attendee who is not associated with the email addresses; and
if it is determined that the email addresses are not associated with the multiple organizations, automatically prompt the meeting to be scheduled on respective calendars associated with the prospective meeting attendees and on a calendar associated with prospective meeting attendee who is not associated with the email addresses.

10. The apparatus of claim 9, wherein the processor is further configured to:
if it is determined that the email addresses are associated with the multiple organizations:
call a scheduling application programming interface in communication with a scheduling server to generate the scheduling link; and
receive the scheduling link from the scheduling server via the scheduling application programming interface.

11. The apparatus of claim 9, wherein the processor is further configured to:
if it is determined that the email addresses are associated with the multiple organizations:
determine that the first group of the email addresses are associated with the first organization.

12. The apparatus of claim 9, wherein the processor is configured to automatically prompt the meeting to be scheduled by calling a scheduling application programming interface in communication with a scheduling server to automatically schedule the meeting.

13. One or more non-transitory computer readable storage media encoded with instructions that, when executed by a processor, cause the processor to:
- receive an email message from a user device;
- parse digital data representing a body of the email message, wherein the body of the email message includes a plurality of email addresses associated with prospective meeting attendees, one or more messages previously sent between the prospective meeting attendees, and a set of tokens including one or more words inserted at the user device before the email message is received from the user device, wherein the set of tokens specifies one or more conditions for scheduling information or a meeting with the prospective meeting attendees;
- based on the parsing, determine that a prospective meeting attendee who is not associated with the email addresses should be included in the meeting based on a tone of the email message and a position of the prospective meeting attendee who is not associated with the email addresses;
- based further on the parsing, extract the email addresses from the email message;
- determine whether the email addresses are associated with multiple organizations;
- if it is determined that the email addresses are associated with the multiple organizations, automatically send a response to the email message including a scheduling link that, when selected, provides the scheduling information for a first group of the prospective meeting attendees who are associated with a first group of the email addresses associated with a first organization and the prospective meeting attendee who is not associated with the email addresses; and
- if it is determined that the email addresses are not associated with the multiple organizations, automatically prompt the meeting to be scheduled on respective calendars associated with the prospective meeting attendees and on a calendar associated with prospective meeting attendee who is not associated with the email addresses.

14. The one or more non-transitory computer readable storage media of claim 13, further encoded with instructions that, when executed by the processor, cause the processor to:
- if it is determined that the email addresses are associated with the multiple organizations:
  - call a scheduling application programming interface in communication with a scheduling server to generate the scheduling link; and
  - receive the scheduling link from the scheduling server via the scheduling application programming interface.

15. The one or more non-transitory computer readable storage media of claim 13, further encoded with instructions that, when executed by the processor, cause the processor to:
- if it is determined that the email addresses are associated with the multiple organizations:
  - determine that the first group of the email addresses are associated with the first organization.

16. The one or more non-transitory computer readable storage media of claim 13, wherein the instructions that cause the processor to automatically prompt the meeting to be scheduled include instructions that cause the processor to call a scheduling application programming interface in communication with a scheduling server to automatically schedule the meeting.

17. The apparatus of claim 9, wherein the one or more conditions include a meeting type, a meeting location, a meeting time, or conferencing software.

18. The one or more non-transitory computer readable storage media of claim 13, wherein the one or more conditions include a meeting type, a meeting location, a meeting time, or conferencing software.

19. The method of claim 1, wherein the user device is associated with a scheduler of the meeting.

20. The method of claim 7, wherein the one or more conditions include a length of time within which the meeting is to be scheduled.

* * * * *